CROSS RING LOCK

Filed Sept. 9, 1968 2 Sheets-Sheet 1

INVENTOR.
EDWARD L. PARR
BY
Warren H. F. Schmieding
ATTORNEY

CROSS RING LOCK
Filed Sept. 9, 1968 2 Sheets-Sheet 2
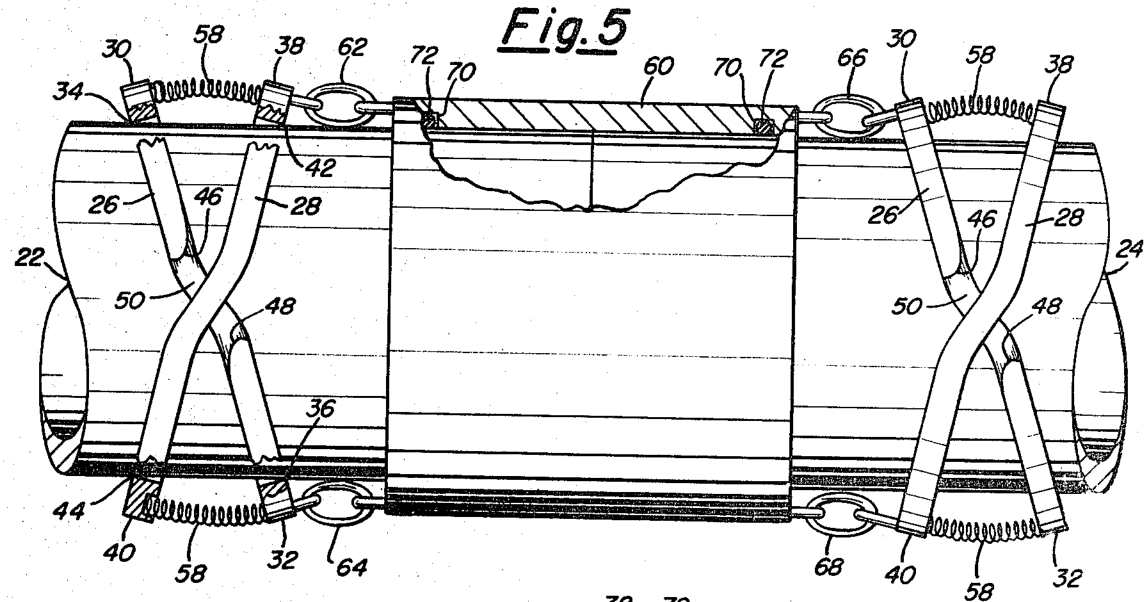
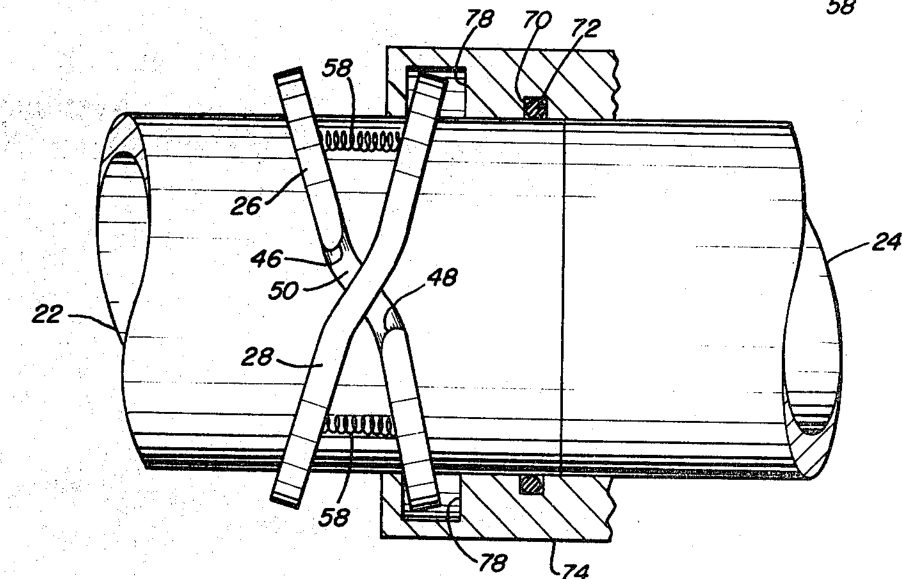
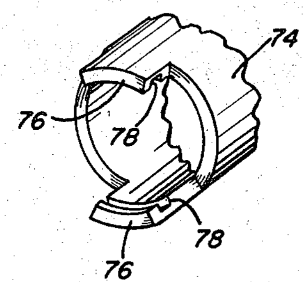
Fig.7
INVENTOR.
EDWARD L. PARR
BY
Warren H. F. Schmieding
ATTORNEY

United States Patent Office 3,526,933
Patented Sept. 8, 1970

3,526,933

CROSS RING LOCK

Edward L. Parr, El Cajon, Calif., assignor to Wendell L. Thompson, Burbank, Calif.

Continuation-in-part of application Ser. No. 512,567, Dec. 6, 1965. This application Sept. 9, 1968, Ser. No. 758,212
Int. Cl. A44b *21/00;* F16l *37/00*
U.S. Cl. 24—73 13 Claims

ABSTRACT OF THE DISCLOSURE

A coupling for joining two elements such as pipes, which coupling includes a pair of rings disposed in interlaced and crosswise relationship. Each ring is provided with diametrically disposed portions, each portion having a gripping surface on the inner arcuate side thereof. The gripping surfaces of one of the rings is capable of gripping both of the elements. Likewise, the two gripping surfaces of the other ring are capable of gripping both of the elements.

CROSS-REFERENCES TO RELATED APPLICATIONS

The present application is a continuation-in-part of applicant's copending application, Ser. No. 512,567, filed Dec. 6, 1965.

BACKGROUND OF THE INVENTION

Field of the invention

The invention is directed to couplings of the type which secures the ends of two elements, such as pipes, to one another without the use of extraneous tools.

Description of the prior art

The prior art, such as the Italian patent to Hofer No. 595,001, the Australian patent to Blackmore et al. No. 242,840, the U.S. patent to Fairclough No. 2,806,723 and all other references cited in the copending patent application, except the patent to Bayles No. 1,493,951, fails to show couplings of the cross ring type. The Bayles patent shows a cross ring type of coupling, but one end only of each ring is provided with a gripping surface.

The prior art structures, not having cross rings of the type in which the opposite ends of each ring are in the form of gripping surfaces, are complicated and expensive to manufacture. The structure of the present invention solves the problem by removing complications and by reducing the cost of manufacture.

SUMMARY OF THE INVENTION

The coupling includes two rings, one interlaced with and extending crosswise of the other. Preferably one ring extends through the other. Each ring includes two shoulders spaced from one another at a distance greater than the width of the material forming the ring. These shoulders form abutments for limiting the translatable movement of the rings relative to one another.

The opposite ends of each ring are provided with gripping surfaces for gripping the pipes. When desirable, compression springs are employed at the gripping ends of a pair of rings to yieldingly urge the rings in spread relationship.

Other features and the advantages of the present invention will be apparent from the following description, reference being made to the accompanying drawings wherein preferred embodiments of the invention are illustrated.

BRIEF DESCRIPTION OF THE DRAWINGS

FIG. 5 is a view showing another application of the invention in which two pairs of cross rings are employed, one pair of rings being connected in gripping relationship with one pipe and the other pair being connected in gripping relationship with the other pipe, together with one form of connecting member connecting the rings of the pairs of rings with one another, the connecting member being shown as a sleeve, part of the sleeve being shown in section to show the sealing rings;

FIG. 6 is a fragmentary view showing a different form of connecting the coupling with a sleeve, the sleeve being shown in section, the section being taken along line 6—6 of FIG. 7; and FIG. 7 is a fragmentary perspective end view of the sleeve shown in FIG. 6.

DESCRIPTION OF THE PREFERRED EMBODIMENTS

Figure 1:
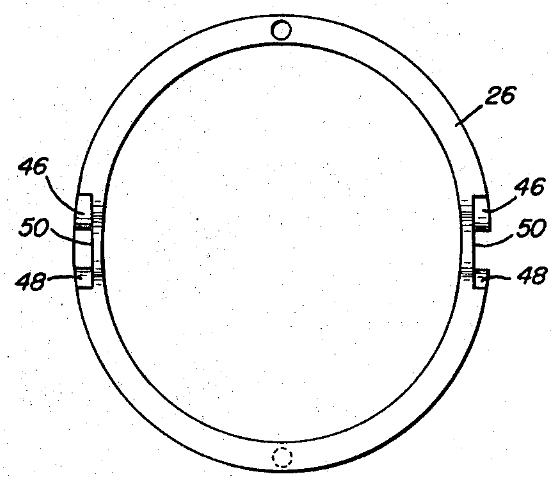
FIG. 1 is a side view of one of the rings.
Figure 2:
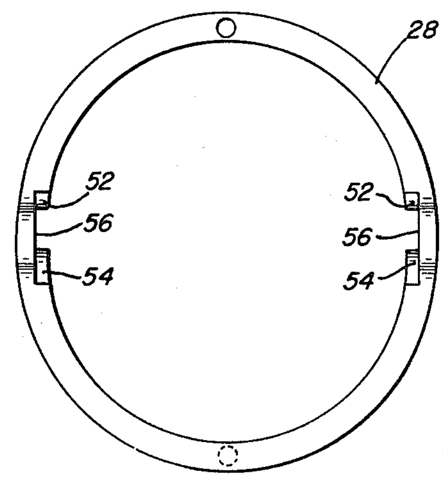
FIG. 2 is a side view of the other ring.
Figure 4:
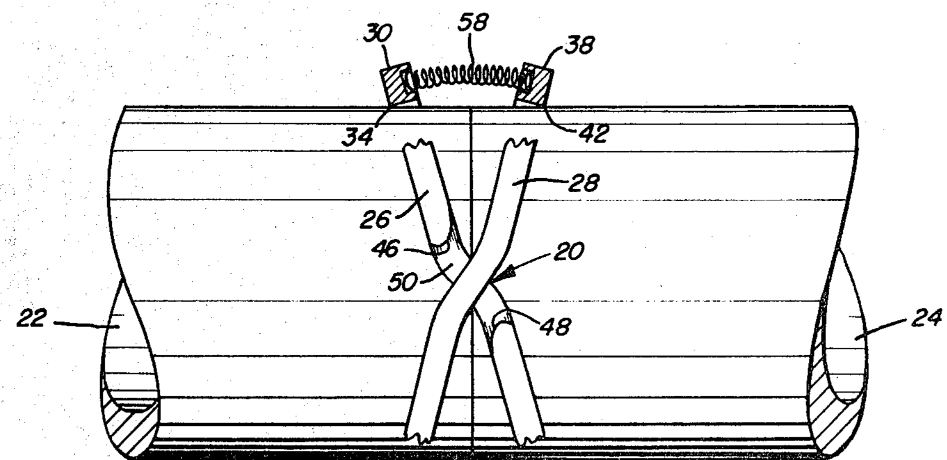
FIG. 4 is a view showing one use of the coupling, the rings being in coupling relationship with two pipes, portions of the rings being shown in section to show the gripping surfaces of each of the rings.
Figure 3:
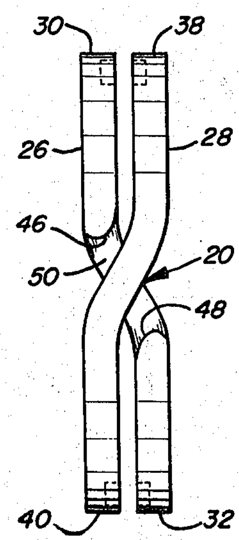
FIG. 3 is a view of the rings in assembled relationship.

Referring to FIG. 4, it will be seen that the coupling 20 is employed for connecting two elements, herein shown as pipes 22 and 24. The coupling 20 includes two rings 26 and 28, which are interlaced with one another in a crosswise manner. Preferably one ring 26 extends crosswise through ring 28. Ring 26 is provided with diametrically disposed portions 30 and 32, the portions including gripping surfaces 34 and 36, respectively, on the arcuate inner side thereof. Ring 28 is provided with diametrically disposed portions 38 and 40, the portions including gripping surfaces 42 and 44, respectively, on the arcuate inner side thereof.

Any suitable means may be employed for retaining the rings 26 and 28 in cooperative relationship. The means herein illustrated comprises shoulders formed by grooves. The shoulders 46 and 48 on ring 26 are formed by grooves 50 in the periphery of the ring, and the shoulders 52 and 54 on ring 28 are formed by grooves 56 in the inner surface of that ring. These grooves 50 and 56 are disposed midway intermediate the portions 30 and 32 of ring 26 and midway intermediate the portions 38 and 40 of ring 28, respectively.

The rings are formed of flexible and resilient material, preferably of steel. Ring 26 is inserted into ring 28 by flexing the same. The shoulders 46, 48, 52 and 54 limit the extent of translatable movement of the rings relative to one another. Compression springs 58 are interposed, respectively, between portions 30 and 38 and between portions 32 and 40 of the rings to thereby yieldingly urge the portions apart.

A coupling 20 is placed about one of the pipes 22 or 24, for example pipe 22, and then after the ends of the pipe are brought together, the coupling is compressed manually and moved to the right, i.e. to the position shown in FIG. 4. Thereafter, the manual compression is released whereby the gripping surfaces 34, 36, 42 and 44 become effective for retaining the pipes in coupled relationship. Any tendency to move the pipes away from one another, enhances the gripping effects of the gripping surface.

Referring now to the embodiment shown in FIG. 5, two couplings 20 are employed, one having all gripping surfaces 34, 36, 42 and 44 in gripping relationship with pipe 22 and the other coupling having all gripping surfaces in gripping relationship with pipe 24. A connecting member in the form of a sleeve 60 surrounds the adjoining ends of pipes 22 and 24. Chain type links 62 and 64 connect, respectively, portion 38 of ring 28 and portion 32 of ring 26 with the left end of sleeve 60, and like links 66 and 68 connect, respectively, portion 30 of ring 26 and portion 40 of ring 28 with the right end of sleeve 60. Circular grooves 70 are formed on the inner surface of the sleeve 60 for receiving sealing ring 72.

Referring to the embodiment shown in FIGS. 6 and 7, a sleeve 74 surrounds the ends of pipes 22 and 24. Each end of the sleeve is provided with extensions, those at the left end being shown at 76. Each extension is provided with a groove 78 which is coaxial with the axis of the sleeve. These grooves, at the left end of the sleeve, receive the portion 30 of ring 26 and portion 40 of ring 28. Sealing rings 72 are disposed in grooves 70 in the inner surface of sleeve 74. If desirable, compression springs 58 can be interposed between the rings as shown in FIG. 6.

Thus it is apparent that I have provided a simple, inexpensive and easily manipulated coupling for elements such as pipes. Extraneous tools are not necessary for applying or removing the coupling. Furthermore, the coupling is of the type in which friction to maintain the elements is enhanced should there be any tendency to impart unintentional separation of the elements.

Preferably the rings are oval in shape, the major axis intersecting the center of the gripping surfaces to thereby provide increased gripping function in contact with the pipe.

Having described my invention, I claim:

1. A coupling for joining two elements, such as pipes, said coupling comprising:
- (A) a pair of rings in interlaced and crosswise relationship, each of said rings having:
  - (1) diametrically disposed portions having confronting gripping surfaces;
- (B) means for yieldingly urging the gripping surfaces of one of the rings away from the gripping surface of the other ring.

2. A coupling as defined in claim 1, characterized in that at least one of said rings has:
- (2) diametrically disposed ring securing sections disposed intermediate the gripping surfaces for interconnecting the rings, the securing sections of said one ring being in the form of shoulders in the periphery of the said one ring for receiving those sections of the other ring, which latter sections lie intermediate the gripping surfaces of said other ring.

3. A coupling for joining two elements, such as pipes, said couplings comprising:
- (A) a pair of rings in interlaced and crosswise relationship, each of said rings having:
  - (1) diametrically disposed portions having confronting gripping surfaces,
  - (2) diametrically disposed ring securing sections disposed intermediate the gripping surfaces for interconnecting the rings, the securing sections of said one ring being in the form of shoulders in the inner surface of said one ring for receiving those sections of the other ring, which latter sections lie intermediate the gripping surfaces of the said other ring.

4. A coupling as defined in claim 3, characterized in that the shoulders on each section of said one ring are spaced from one another a distance greater than the width of the material forming the intermediate sections of the other ring which is received between the shoulders.

5. A coupling for joining two elements, such as pipes, said coupling comprising:
- (A) a pair of rings in interlaced and crosswise relationship, each of said rings having:
  - (1) diametrically disposed portions having confronting gripping surfaces,
  - (2) diametrically disposed ring securing sections disposed intermediate the gripping surfaces for interconnecting the rings, the shoulders on each section of said one ring being spaced from one another a distance greater than the width of the material forming the intermediate section of the other ring which is received between the shoulders.

6. A coupling for joining two elements, such as pipes, said coupling comprising:
- (A) a pair of rings in interlaced and crosswise relationship, each of said rings having:
  - (1) diametrically disposed portions having confronting gripping surfaces,
  - (2) diametrically disposed ring securing sections disposed intermediate the gripping surfaces for interconnecting the rings, said securing sections of one ring being in complementary and securing relationship with the securing sections of the other ring, the securing sections of one of the rings being in the periphery thereof and the securing sections of the other ring being in the inner surfaces thereof, the securing sections of each of the rings being spaced from one another a distance greater than the width of the material of the intermediate section of the ring received thereby.

7. A coupling for joining two elements, such as pipes, said coupling comprising:
- (A) a pair of rings in interlaced and crosswise relationship, each of said rings having:
  - (1) diametrically disposed portions having confronting gripping surfaces;
- (B) a second pair of rings like the first mentioned pair;
- (C) a connecting member between the two pairs of rings for connecting certain of the portions, having the gripping surfaces, of the first mentioned pair of rings with the like portions of the second mentioned pair of rings.

8. A coupling for joining two elements, such as pipes, said coupling comprising:
- (A) a pair of rings in interlaced and crosswire relationship, each of said rings having:
  - (1) diametrically disposed portions having confronting gripping surfaces;
- (B) a second pair of rings like the first mentioned pair, said pairs of rings being alignable, one pair being adapted to encompass one of said elements and the other pair being adapted to encompass another of said elements whereby certain of said portions of the pair of rings having the gripping surfaces, are nearer to one another than other portions of the pair of rings having gripping surfaces;
- (C) a connecting member for connecting said nearer portions with one another.

9. A coupling as defined in claim 8, characterized in that the connecting member is in the form of a sleeve which is adapted to surround the ends of the elements.

10. A coupling as defined in claim 8, characterized in that each ring of one pair of rings has a gripping surface which is nearer to the like gripping surfaces of the other pair of rings than the other pairs of gripping surfaces of the pairs of rings, and that the connecting member is connected with the nearer sections.

11. A coupling as defined in claim 10, characterized to include:
- (D) sealing rings in sealing relationship with the interior of the sleeve.

12. A coupling for joining two elements, such as pipes, said coupling comprising:
- (A) a ring;

(B) a second ring extending crosswise through and in interlatched relationship with the first mentioned ring, each of said rings having:

(1) a shoulder adapted to abut the other ring for retaining the rings in interlatched relationship, at least one of said rings being formed of flexible and resilient material.

13. A coupling as defined in claim 12, characterized in that both of said rings are formed of flexible and resilient material.

References Cited

UNITED STATES PATENTS

| | | | |
|---|---|---|---|
| 1,493,951 | 5/1924 | Bayles | 285—308 |
| 2,477,592 | 8/1949 | Gage | 285—317 XR |

DONALD A. GRIFFIN, Primary Examiner

U.S. Cl. X.R.

24—81; 285—308